United States Patent [19]

Watrous

[11] 4,268,879

[45] May 19, 1981

[54] SUSPENSION FOR AIR BEARING HEAD ARM ASSEMBLY

[75] Inventor: Robert B. Watrous, San Jose, Calif.

[73] Assignee: International Business Machines Corporation, Armonk, N.Y.

[21] Appl. No.: 36,614

[22] Filed: May 7, 1979

[51] Int. Cl.³ .................... G11B 5/48; G11B 21/24
[52] U.S. Cl. .................................... 360/104; 360/103
[58] Field of Search .................. 360/104, 105–107, 360/109, 130.1, 103

[56] References Cited

U.S. PATENT DOCUMENTS

| | | | |
|---|---|---|---|
| 3,368,210 | 2/1968 | Zimmer | 360/103 |
| 3,405,404 | 10/1968 | Johnson | 360/103 |
| 3,612,775 | 10/1971 | Miller | 360/103 |
| 3,896,495 | 7/1975 | Beecroft | 360/103 |
| 4,058,843 | 11/1977 | Gyi | 360/105 X |
| 4,120,010 | 10/1978 | Mitsuya et al. | 360/105 X |
| 4,167,765 | 9/1979 | Watrous | 360/104 X |
| 4,167,766 | 9/1979 | Chau | 360/104 |

FOREIGN PATENT DOCUMENTS 2341174 9/1977 France .................................. 360/103
232319 5/1969 U.S.S.R. .............................. 360/103

OTHER PUBLICATIONS

IBM, TDB vol. 18, No. 11, Apr. 1976, pp. 3813–3814, "Low–Load Beam Suspension . . . " by Watrous.

Primary Examiner—John H. Wolff
Attorney, Agent, or Firm—Nathan N. Kallman

[57] ABSTRACT

A magnetic head arm suspension assembly which supports air bearing head sliders and magnetic transducers comprises a rigid load beam coupled to a box-like arm through a spring element which has flexible legs. The load beam is seated in a recess in the arm, so that the centerlines of the load beam and of the spring are coincident. In this manner, the sliders and magnetic transducers, which are mounted to the suspension assembly, are loaded in a direction perpendicular to the planar surface of a moving storage medium and maintained in a parallel plane relative to the planar surface of the medium.

8 Claims, 6 Drawing Figures

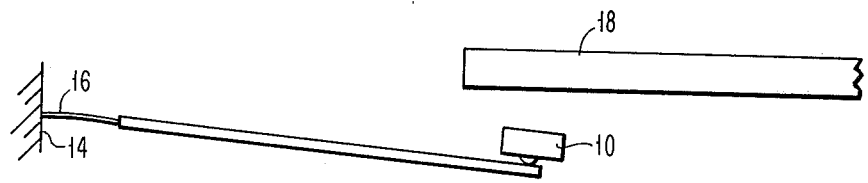
PRIOR ART FIG. 1A
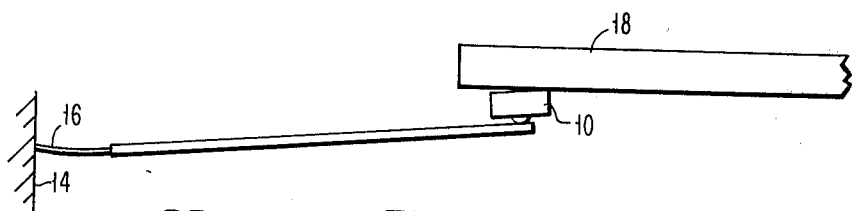
PRIOR ART FIG. 1B
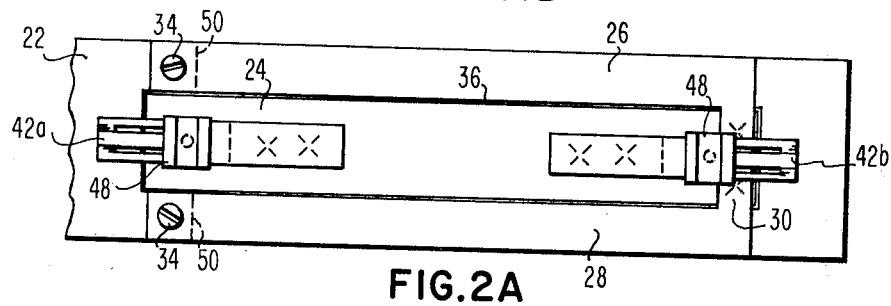
FIG. 2A
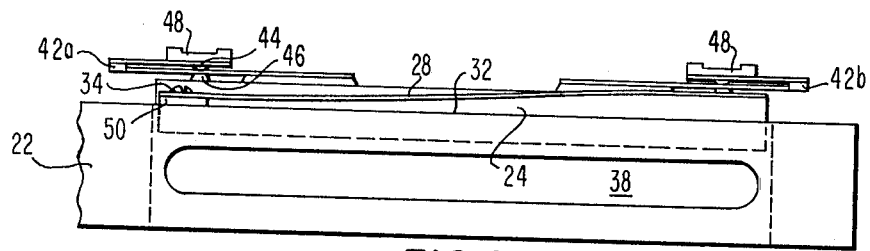
FIG. 2B
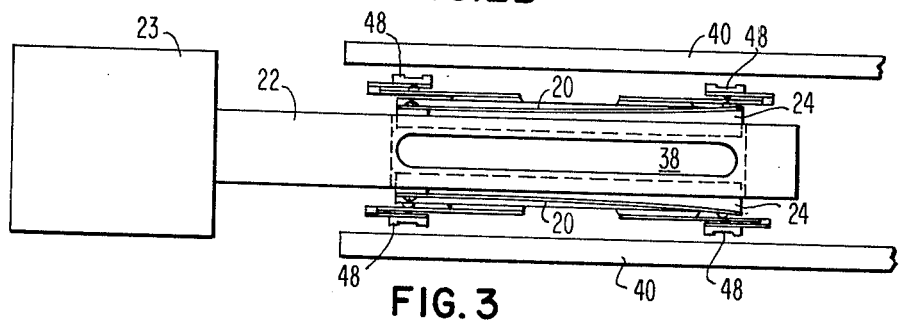
FIG. 3

SUSPENSION FOR AIR BEARING HEAD ARM ASSEMBLY

TECHNICAL FIELD

This invention relates to an improved magnetic head arm assembly and in particular to a novel suspension for magnetic heads.

An object of this invention is to provide a novel and improved suspension for a magnetic head arm assembly.

Another object of this invention is to provide a head arm suspension assembly which affords loading of magnetic heads to a moving disk surface in a controlled manner.

Another object is to provide a suspension for a magnetic head assembly that minimizes undesirable radial, circumferential and yaw motions.

BACKGROUND ART

It is known that a magnetic head arm assembly, which is employed for radially accessing different data tracks of a rotating magnetic disk, is subject to different forces that will vary the spatial position of the head transducing gap relative to a data track on the disk that is being scanned.

For example, heads that access different tracks on the surface of a magnetic disk and that start and stop in contact with the rotating disk experience undesirable radial and circumferential forces. Frictional drag is generated while stopping or starting the disk, thereby producing circumferential forces that affect head performance. In order to maintain wear of the head and the disk within practical limits, the head load and the frictional drag are maintained low. As a result, the largest forces that are experienced by the head suspension are the radial accessing forces.

In view of the variations in the topography of the disk surface, and in order to have the magnetic transducer closely follow the disk surface at a constant spacing and attitude, it is an objective to minimize the effects of radial and circumferential forces that are applied to the head arm. It would be highly advantageous to achieve flexibility of movement for the roll and pitch of the magnetic transducer, of the slider to which it is joined, and of the flexure or supporting suspension for the slider, while realizing rigidity against radial, circumferential and yaw motions.

BRIEF DESCRIPTION OF THE DRAWING

The invention will be described in greater detail with reference to the drawing in which:

FIGS. 1A and 1B are explanatory representations of prior art structures;

FIGS. 2A and 2B are top and side views of the novel suspension assembly, according to this invention;

FIG. 3 is a side view of the head arm, shown in relation to magnetic storage disks and a head actuator to aid in the explanation of the invention.

DISCLOSURE OF THE INVENTION

Figure 4:
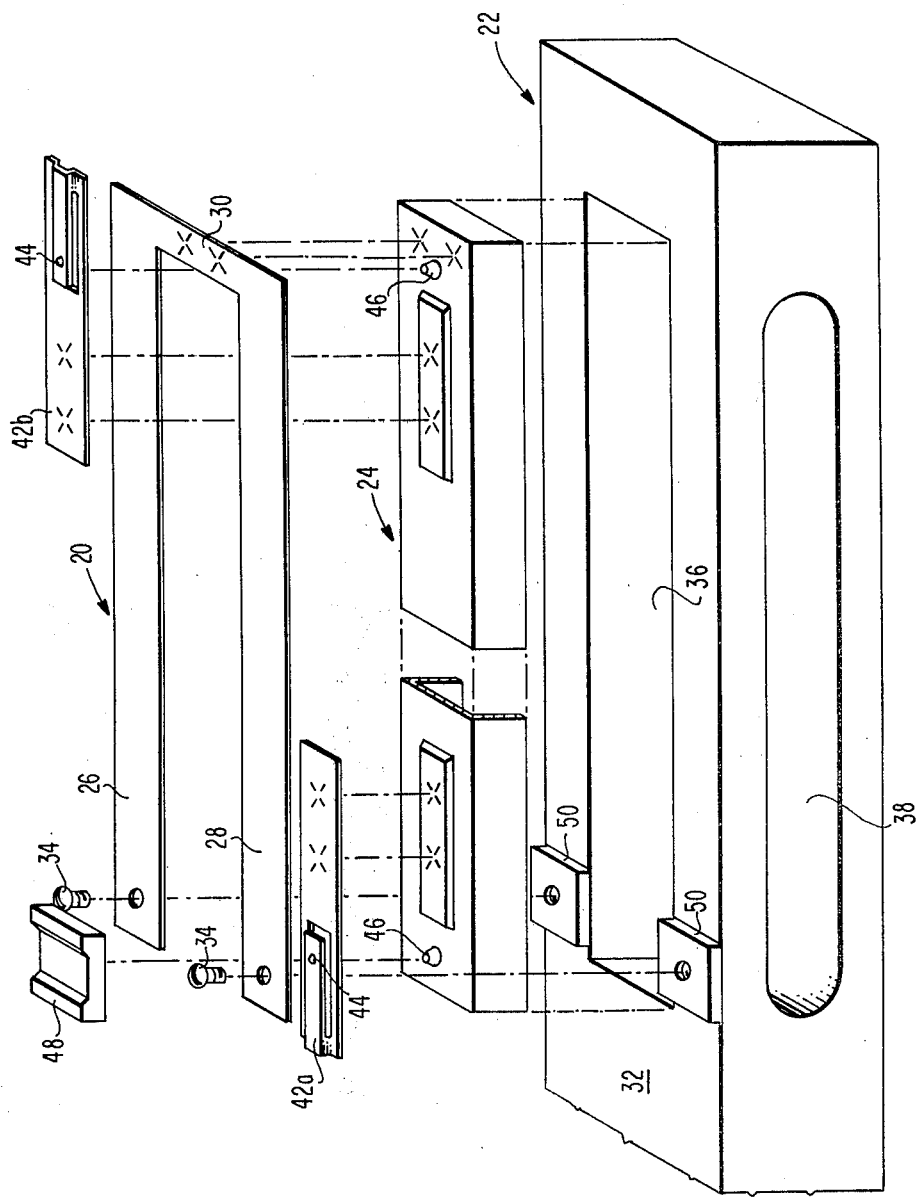
FIG. 4 is an exploded view illustrating the several parts utilized in the head arm suspension assembly of this invention.

With reference to FIGS. 1A and 1B, which are representational illustrations of prior art head suspensions, a magnetic head 10 is shown attached to a rigid load beam 12. The beam 12 is coupled to an arm structure 14 through a hinge spring 16. In FIG. 1A, the head 10 is shown in an unloaded position relative to a magnetic disk 18, which is stationary prior to operation of a disk drive.

In FIG. 1B, the head 10 is shown loaded to the disk 18, which is rotating during the read and write modes of the disk drive. It is noted that the attitude of the head relative to the disk is such that there is no parallel relation between the surfaces of the head and disk. This nonparallelism will adversely affect signal resolution and amplitude, and may cause head crashes.

In accordance with the invention as depicted in FIGS. 2, 3, and 4, a flexible spring 20 is attached to an arm 22 and to a load beam 24. The spring 20 is formed with two legs 26 and 28 and a connecting portion 30, and is generally C-shaped, or in an open rectangular form. The flexible spring may be made from a thin, flat stainless steel and is joined, by spot welding for example, at its connecting portion 30 to the top surface of the load beam 24. The ends of the legs 26 and 28 of the spring 20 are connected to the adjacent surface 32 of the arm 22, by clamping screws 34, by way of example. Apertured spacers 50 which accommodate the screws 34 are provided between the surface 32 of the arm 22 and legs 26, 28 of the spring 20.

As depicted in FIG. 4, the arm 22 is configured as a hollow box, made of relatively light material such as aluminum. The arm 22 may be connected to an actuator 23, such as a voice coil motor, for accessing different data tracks, or may be stationary and supporting a fixed head relative to an associated data track. The arm 22 has a recess 36 formed in the surface 32 into which the load beam 24 is seated. The load beam is formed in a box-like configuration, and is made of stainless steel, for example. The geometry of the load beam is such that clearance is minimal between the walls of the box-like beam and the walls of the arm recess, thereby minimizing air leakage, yet allowing the beam to move up and down relative to the depth of the recess 36.

The arm 22 also has a slot 38 formed in its side, which allows air to be drawn into the interior of the hollow arm when an adjacent disk 40 is rotating. The air entering the slot 38 provides an aerodynamic force for loading the beam towards the surface of the rotating disk 40.

Flexures 42a, b are attached to each end of the load beam 24, by spot welding for example. Each of the flexures 42 has a dimple or button-like protuberance 44 that contacts the flat top of respective raised pedestals 46 disposed on the surface of the load beam. The dimple 44 and pedestal 46 form a pivot point for the flexure to allow pitch and roll while following the variations in the disk surface.

Air bearing head sliders 48 (only one shown in FIG. 4) are bonded to the center of each flexure 42a, b. Each slider supports a magnetic transducer having a transducing gap at the air bearing surface of the slider for transducing action with the rotating magnetic disk.

With the configuration disclosed herein, a force that is applied to the centerline C/L of the load beam and spring will cause the load beam to move in the direction of the force without any rotational effects. In this way, the structures including the flexures and heads on either side of the centerline will move together, towards and away from a rotating disk, in a plane that is substantially parallel to the plane of the rotating disk surface facing the heads. The force for moving the load beam and heads to the disk may be the air pressure generated by the rotating disk and transmitted through the arm slot and applied to the load beam; or a mechanically applied force. By virtue of this novel design, head crashes are minimized and reliability is improved.

I claim:

1. A magnetic head arm suspension assembly for supporting a flying head comprising:
   a hollow box-like arm having a flat planar surface and a recess therein;
   a load beam element matingly seated in a close fit relation within said recess, said load beam element having a flat planar surface;
   a U-shaped flat planar resilient spring the cross-arm of said spring attached to said planar surface of said load beam element, and the other end attached to said planar surface of said arm; and
   first and second magnetic transducers mounted respectively at each end of said planar surface of said load beam and adjacent to said one end and said other end of said spring on either side of the center lines of said load beam and said spring for translation in a direction orthogonal to said flat planar surface of said arm while the transducers move in a parallel relationship.

2. A magnetic head arm suspension assembly as in claim 1, wherein the centerline of said load beam is coincident with the centerline of said spring.

3. A magnetic head arm suspension assembly as in claim 1, wherein said free ends of said spring are formed from parallel flat sections disposed in the same plane.

4. A magnetic head arm suspension assembly as in claim 1, wherein said load beam is configured as a rectangular box.

5. A magnetic head arm suspension assembly as in claim 1, including flat spacers disposed between said arm and said spring.

6. A magnetic head arm suspension assembly as in claim 1, including two flexures mounted to said arm suspension assembly.

7. A magnetic head arm suspension assembly as in claim 6, wherein said load beam element includes a flat top pedestal and said flexures include projections for forming spacings and pivot point between each of said flexures and said load beam.

8. A magnetic head arm suspension assembly as in claim 1, wherein said box-like arm as a slot in a side wall connecting to said recess for accepting air flow to be applied to said load beam.

* * * * *